US012704417B2

(12) United States Patent
Griffiths

(10) Patent No.: US 12,704,417 B2
(45) Date of Patent: Aug. 11, 2026

(54) INTERNAL DATA ACQUISITION DEVICE FOR VACUUM FURNACE

(71) Applicant: DATAPAQ Limited, Norwich (GB)

(72) Inventor: Stewart Griffiths, Norwich (GB)

(73) Assignee: Fluke Corporation, Everett, WA (US)

( * ) Notice: Subject to any disclaimer, the term of this patent is extended or adjusted under 35 U.S.C. 154(b) by 391 days.

(21) Appl. No.: 18/470,191

(22) Filed: Sep. 19, 2023

(65) Prior Publication Data

US 2024/0094066 A1 Mar. 21, 2024

(30) Foreign Application Priority Data

Sep. 20, 2022 (EP) .................................... 22196718

(51) Int. Cl.

| | |
|---|---|
| ***G01K 13/00*** | (2021.01) |
| ***F27D 21/00*** | (2006.01) |
| ***G01K 1/024*** | (2021.01) |
| ***G01K 1/14*** | (2021.01) |
| ***G01K 7/02*** | (2021.01) |

(52) U.S. Cl.

CPC ............. *G01K 13/00* (2013.01); *F27D 21/00* (2013.01); *G01K 1/024* (2013.01); *G01K 1/14* (2013.01); *G01K 7/02* (2013.01)

(58) Field of Classification Search

CPC .......... G01K 13/00; G01K 1/024; G01K 1/14; G01K 7/02; F27D 21/00; F27D 21/0014; F27D 2007/066; F27D 7/06; F27B 5/04; F27B 5/18

See application file for complete search history.

(56) References Cited

U.S. PATENT DOCUMENTS 5,795,539 A * 8/1998 Sakurai ..................... F27D 9/00 266/46
2005/0145614 A1 7/2005 Wu et al.
2025/0146753 A1 * 5/2025 Ferkel ..................... F27D 21/00

FOREIGN PATENT DOCUMENTS

CN 114059009 2/2022

OTHER PUBLICATIONS

European Search Report for Application No. EP22196718, dated Jan. 25, 2023, 2 pages.
Osterman, et al., "Understanding Vacuum Furnace Temperature Measurement Issues", https://solaratm.com/uploads/2015/08/understanding-vacuum-furnace-temp-bill-jones-asm-webinar.pdf 2017, retrieved on May 31, 2024, 42 pages.
Peppler, "Temperature Measurement in Vacuum Furnaces: Problems and Solutions", ASM International, 2016, https://www.youtube.com/watch?y=iiH7n57qqHA, retrieved May 31, 2024, 9 pages.

* cited by examiner

*Primary Examiner* — John E Breene
*Assistant Examiner* — Manuel Salvador Castellon, Jr.
(74) *Attorney, Agent, or Firm* — Dority & Manning, P.A.

(57) ABSTRACT

There is provided a measurement apparatus for a vacuum furnace, comprising a data acquisition device, comprising a sensor interface operable to electrically couple one or more sensors to the data acquisition device, and a thermally conductive layer disposed on a first surface of the data acquisition device and to provide a thermally conductive interface between the first surface of the data acquisition device and a cooled internal surface of the vacuum furnace.

20 Claims, 6 Drawing Sheets

INTERNAL DATA ACQUISITION DEVICE FOR VACUUM FURNACE

PRIORITY CLAIM

This application is based on and claims priority to and the benefit of European Patent Application 22196718.5 having a filing date of Sep. 20, 2022, which is incorporated by reference herein in its entirety for all purposes.

BACKGROUND

Vacuum furnaces can be used for the thermal treatment of metal, alloy and ceramic products, as well as heat treatment processes such as annealing, stress relief, brazing, sintering, and hardening operations. By conducting these heat treatment processes in a vacuum, undesirable material properties caused by the presence of oxygen can be avoided, thus resulting in an end product with desirable mechanical properties. These parts are often used in products for automotive and aerospace applications, including critical applications.

A cold wall vacuum furnace comprises a liquid-cooled and pressure-resistant furnace vessel. The cold wall vacuum furnace further comprises an insulated layer surrounding a hot zone, within which heating elements are located. The hot zone is physically separated from the furnace vessel. The load is positioned in the hot zone, such that it is directly exposed to the heating elements. The liquid-cooling of the furnace vessel allows the furnace vessel to maintain structural integrity under vacuum or pressure, while the vacuum furnace is operating at elevated temperatures.

Cold wall vacuum furnaces may additionally include systems for high-pressure oil or gas quenching of the load. Gas quenching may be utilized in order to rapidly cool the content of the hot zone, and generally uses a circulating fan or blower and a heat exchanger assembly. Cold wall vacuum furnaces offer advantages compared to traditional hot wall furnaces, including higher maximum operating temperatures, faster load heating, greater control of temperature uniformity, and lower heat losses to surroundings.

BRIEF SUMMARY

This disclosure provides a measurement apparatus for a cold wall vacuum furnace, including a data acquisition device comprising a sensor interface operable to electrically couple one or more sensors to the data acquisition device, and a thermally conductive layer arranged to provide a thermally conductive interface between a first surface of the data acquisition device and a cooled internal surface of the vacuum furnace.

This disclosure further provides a method for data acquisition in a cold wall vacuum furnace, comprising positioning a data acquisition device proximate a cooled internal surface of a cold wall vacuum furnace, and providing a thermally conductive interface between a first surface of the data acquisition device and the cooled internal surface of the cold wall vacuum furnace.

This disclosure further provides a system for data acquisition in a cold wall vacuum furnace, comprising a cold wall vacuum furnace, the cold wall vacuum furnace having a hot zone and a cooled internal surface, one or more sensors positioned in the hot zone of the vacuum furnace, and a measurement apparatus as described above.

BRIEF DESCRIPTION OF THE DRAWINGS

Further details, aspects and embodiments of the disclosure will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
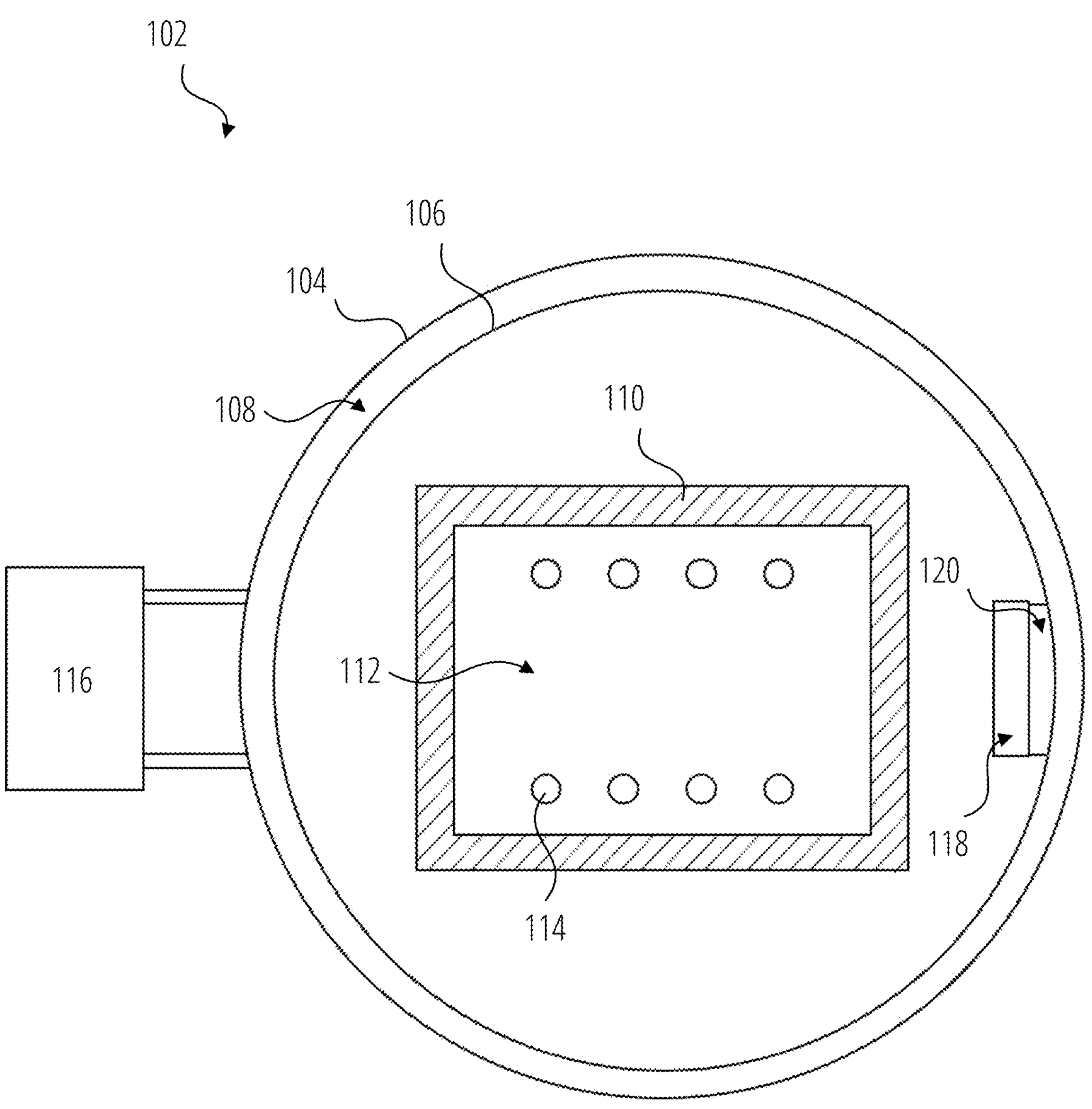
FIG. 1 shows a cold wall vacuum furnace, according to some examples disclosed herein.

In the following description, for the purposes of explanation, numerous specific details of certain examples are set forth. Reference in the specification to "an example" or similar language means that a particular feature, structure, or characteristic described in connection with the example is included in at least that example, but not necessarily in other examples.

For the heat treatment of high purity parts, in particular for automotive and aerospace applications, a cold wall vacuum furnace may need to be certified, which can involve verification of temperature uniformity within the furnace. Additionally, it may be desirable to measure the temperature of the parts being treated. To measure the temperature, one or more thermocouples may be positioned at various points within the hot zone of the furnace. A thermocouple is an electrical device consisting of two dissimilar electrical conductors forming an electrical junction, which produces a temperature-dependent voltage as a result of the Seebeck effect. Thermocouples are widely used as temperature sensors.

Conventionally, a thermocouple positioned in the hot zone may be connected to a data acquisition device external to the vacuum furnace. In order to connect the thermocouple to the data acquisition device, feed-through connectors are used. A feed-through connector is used to maintain a vacuum or pressure inside of the vacuum furnace, whilst enabling an electrical or optical signal from the thermocouple to pass outside of the vacuum furnace. Feed-through connectors are typically fragile and prone to failure, and as such can compromise the integrity of the vacuum environment. Additionally, as a feed-through connector is typically welded, any failure can result in equipment down-time whilst the failed connector is replaced.

A known alternative to the use of feed-through connectors is to position the data acquisition device inside of the vacuum furnace inside a thermally insulated enclosure. However, thermally insulating materials available for a thermally insulated enclosure are known to experience outgassing when exposed to significant heat, which result in insufficient vacuum being achieved for certain heat treatment processes. Additionally, the thermally insulating materials generally have maximum operating temperatures of approximately 1200° C., and are therefore unsuited to high temperature heat treatment processes. Should the data acquisition device exceed a maximum operating temperature, overheating of one or more components of the data acquisition device may occur, and cause the data acquisition device to shut down, or otherwise stop operation, which can result in interruption of data recording or corrupted data.

In accordance with the present disclosure, a data acquisition device may be located inside of the vacuum furnace, proximate the cooled internal surface of the furnace vessel of the vacuum furnace. A thermally conductive layer is used between the data acquisition device and the cooled internal surface in order to create a thermally conductive interface between the data acquisition device and the cooled internal surface. The cooled internal surface of the furnace vessel acts as a heat-sink for the data acquisition device. By applying a thermally conductive layer between the data acquisition device and the cooled internal surface of the furnace vessel, heat from the data acquisition device is transferred to the cooled internal surface of the furnace vessel. Accordingly, the data acquisition device is able to maintain a temperature similar to that of the cooled internal surface of the furnace vessel, and hence the furnace can now operate at higher operating temperatures compared to using conventional technologies, because the data acquisition device is not subjected to such high temperatures.

According to the present disclosure, thermocouples may be positioned in the hot zone of the vacuum furnace to measure the temperature of parts being treated in the vacuum furnace. However, feed-through connectors are not required, because the data acquisition device is not located outside of the vacuum of the furnace vessel. By locating the data acquisition device inside of the vacuum furnace, connections to the one or more thermocouples can be made directly to the data acquisition device, for example through one or more electrically conductive cables. Accordingly, the use of feed-through connectors can be avoided, which eliminates the problems associated with feed-through connectors, such as fragility, high failure rates, and difficulty of repair or replacement.

In some examples, the data acquisition device may include a wireless communication module arranged to wirelessly communicate with an external device located outside of the vacuum furnace.

In some examples, a thermoelectric generator may be coupled to a rechargeable battery of the data acquisition device. This enables the data acquisition device to be operated inside of the cold wall vacuum furnace for an extended period without removing the data acquisition device for changing or recharging of the battery. Various types of rechargeable battery technology are suitable for use in the data acquisition device, including lead-acid, nickel-cadmium (NiCd), nickel-iron (NiFe), nickel-metal hydride (NiMH), lithium-ion (Li-ion), or lithium-ion polymer (LiPo). Various types of thermoelectric generator may be used to provide recharging of the battery, including Seebeck generators.

With reference to FIG. 1, there is illustrated a cold wall vacuum furnace 102. The cold wall vacuum furnace 102 as illustrated in FIG. 1 comprises a furnace vessel comprising an external wall 104 and a cooled internal surface 106, between which cooling fluid 108 is circulated in order to keep cool the cooled internal surface 106.

The cold wall vacuum furnace 102 further comprises an insulated layer 110 surrounding a hot zone 112 of the cold wall vacuum furnace 102. "Hot zone" refers to the area of the vacuum furnace within which the load is placed for the heat treatment process. The hot zone 112 is typically surrounded by an insulated layer 110. According to some examples of the disclosure, the insulated layer 110 may comprise graphite, metal, or a combination thereof, although other suitable thermally insulating materials may be used. The insulated layer may comprise a radiation shield or similar. Within the hot zone 112 are located one or more heating elements 114. A vacuum pump 116 may be used to maintain vacuum conditions inside of the furnace vessel.

A data acquisition device 118 is positioned inside of the furnace vessel of the cold wall vacuum furnace 102, proximate the cooled internal surface 106. A gap between the data acquisition device 118 and the cooled internal surface 106 may be partially or completely filled with a thermally conductive layer in order to form a thermally conductive interface 120.

A "thermally conductive interface" refers to an interface between two parts (in this case, the data acquisition device and the cooled internal surface of the furnace vessel) having high thermal conductivity, and hence high efficiency at transferring heat. A thermally conductive interface may also be referred to as thermal paste, thermal compound, heat sink compound, or heat paste. Thermally conductive materials used to create a thermally conductive layer typically include a polymerizable liquid matrix and a thermally conductive filler. Typical matrix materials include epoxies, silicones, urethanes and acrylates. Typical thermally conductive fillers include aluminium oxide, boron nitride, zinc oxide, and aluminium nitride. Thermally conductive layers may also comprise solvent-based matrix materials, hot-melt adhesives, and pressure-sensitive adhesive tapes. Some thermally conductive layers may comprise micronized silver particles suspended in a silicon or ceramic medium. Some thermally conductive layers comprise a liquid metal, including gallium, indium, tin, or alloys thereof.

Figure 2:
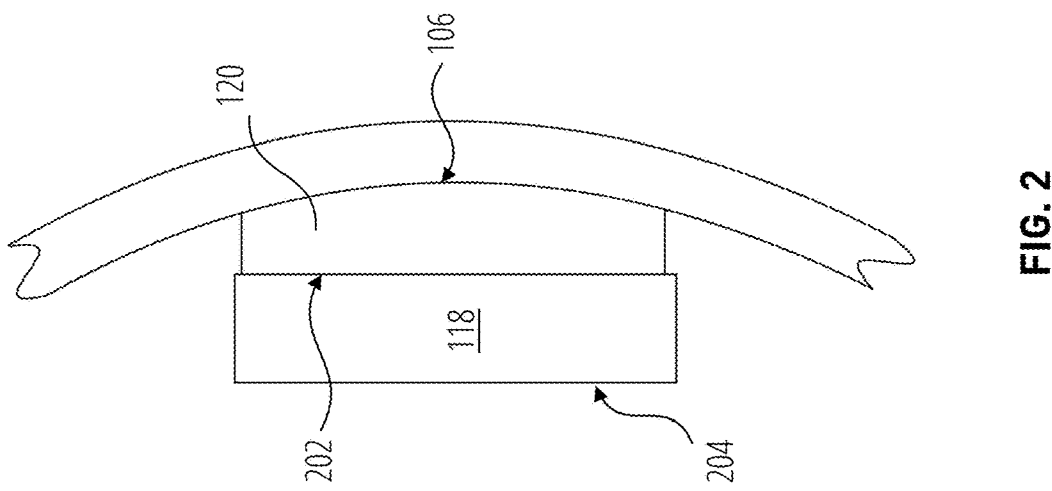
FIG. 2 shows a data acquisition device and associated thermally conductive interface, in accordance with some examples disclosed herein.

FIG. 2 shows a data acquisition device 118 positioned proximate a cooled internal surface 106 of the furnace vessel. A first surface 202 of the data acquisition device 118 is arranged in contact with a thermally conductive interface 120 forming a thermally conductive layer. Thermally conductive interface 120 is also in contact with the cooled internal surface 106 of the furnace vessel.

Due to the high thermal conductivity of the thermally conductive interface 120, heat is transferred from the data acquisition device 118 via the first surface 202, through the thermally conductive interface 120, and to the cooled internal surface 106.

A second surface 204 of the data acquisition device 118 is directly exposed to the vacuum area of the cold wall vacuum furnace 102.

In accordance with some examples, the thermally conductive interface 120 may comprise a malleable thermally conductive layer. Use of a malleable thermally conductive layer enables the thermally conductive interface 120 to conform to a cooled internal surface 106 irrespective of shape, radius or surface texture of the surface. This facilitates improved contact between the thermally conductive interface 120 and the cooled internal surface 106, and hence improved thermal conductivity between the first surface 202 of the data acquisition device 118 and the cooled internal surface 106. In examples, the thermally conductive layer may be malleable when applied between the first surface 202 of the data acquisition device 118 and the cooled internal surface 106, but cures or sets thereafter to form a solid layer. In examples, the thermally conductive layer may remain malleable even during operation of the furnace. The thermally conductive layer may comprise a material with a high plasticity, such as a putty or paste.

Figure 3:
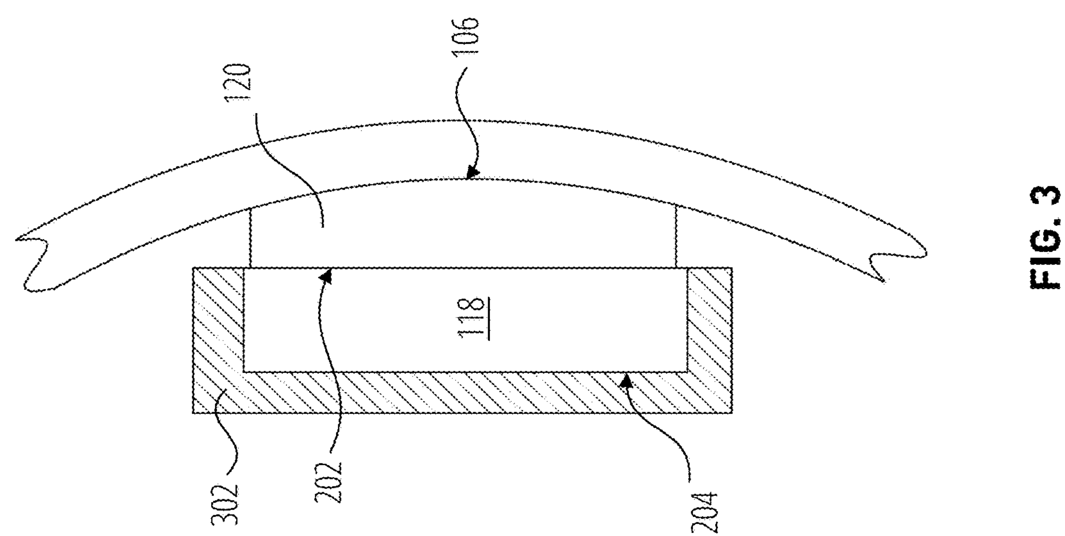
FIG. 3 shows a data acquisition device, thermally conductive interface and thermally insulating layer, in accordance with some examples disclosed herein.

FIG. 3 shows a data acquisition device 118 positioned proximate a cooled internal surface 106 of the furnace vessel. Similarly to FIG. 2, a first surface 202 of the data acquisition device 118 is arranged in contact with a thermally conductive interface 120, with said thermally conductive interface 120 additionally in contact with the cooled internal surface 106 of the furnace vessel.

A second surface 204 of the data acquisition device 118 is provided with a thermally insulating layer 302. Accordingly, the data acquisition device 118 is protected, at least in part, from the heat of the cold wall vacuum furnace 102 by means of the thermally insulating layer 302, which supplements the cooling effect provided by the thermally conductive interface 120 and the cooled internal surface 106. In examples, the thermally insulating layer 302 may cover all surfaces of the data acquisition device 118 other than the first surface 202, thus insulating all surfaces of the data acquisition device 118 which are exposed to the vacuum furnace. In examples, the thermally insulating layer 302 may additionally cover all or part of the thermally conductive interface 120, such that heat from the vacuum furnace is not transferred to the data acquisition device 118 via the thermally conductive interface 120 during a gas quenching phase of a heat treatment process. In examples, the thermally insulating layer does not cover the thermally conductive interface 120, and the thermally conductive interface 120 is left exposed to the vacuum furnace.

By combining the use of a thermally insulating layer 302 with the thermally conductive interface 120, the data acquisition device 118 is able to withstand higher furnace operating temperatures compared to use of the thermally insulating layer 302 or the thermally conductive interface 120 alone. The thermally insulating layer 302 acts to reduce transfer of heat to the data acquisition device 118, whilst the thermally conductive interface 120 acts to increase transfer of heat away from the data acquisition device 118.

Figure 4:
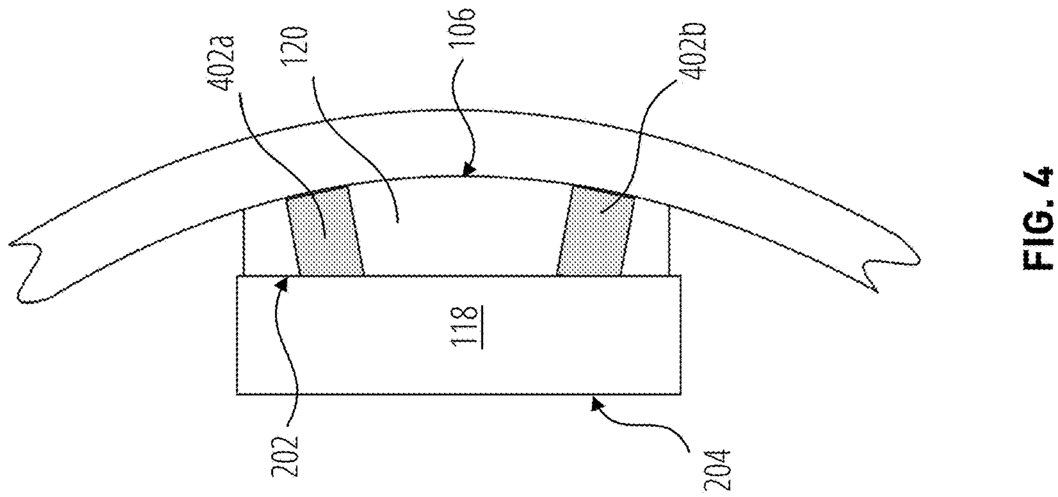
FIG. 4 shows a data acquisition device, thermally conductive interface and magnetic securing means, in accordance with some examples disclosed herein.

FIG. 4 shows a data acquisition device 118 positioned proximate a cooled internal surface 106 of the furnace vessel. Similarly to FIG. 2, a first surface 202 of the data acquisition device 118 is arranged in contact with a thermally conductive interface 120, with said thermally conductive interface 120 additionally in contact with the cooled internal surface 106 of the furnace vessel.

The data acquisition device 118 is removably secured to the cooled internal surface 106 of the furnace vessel by means of one or more magnets 402*a*, 402*b*. In examples, the one or more magnets 402*a*, 402*b* may be thermally conductive, and thus act in conjunction with the thermally conductive interface 120 to transfer heat from the data acquisition device 118 to the cooled internal surface 106 of the furnace vessel.

The use of magnets 402*a*, 402*b* to secure the data acquisition device 118 to the cooled internal surface 106 of the furnace vessel avoids the use of mechanical fasteners such as bolts or similar, the installation of which can compromise the integrity of the vacuum of the cold wall vacuum furnace 102.

In some examples, both the first surface 202 of the data acquisition device 118 and the cooled internal surface 106 of the furnace vessel are ferromagnetic, and therefore the one or more magnets 402*a*, 402*b* are removable from both the data acquisition device 118 and the cooled internal surface 106 of the furnace vessel, and as such can be secured magnetically to both the first surface 202 of the data acquisition device 118 as well as the cooled internal surface 106 of the furnace vessel. In some examples, one or more magnets 402*a*, 402*b* are mechanically fixed to the data acquisition device 118 using a mechanical fastener, and can be secured magnetically to the cooled internal surface 106 of the furnace vessel.

The magnetic securing means of the example shown in FIG. 4 may in some examples be combined with the thermally insulating layer of the example shown in FIG. 3.

Figure 5:
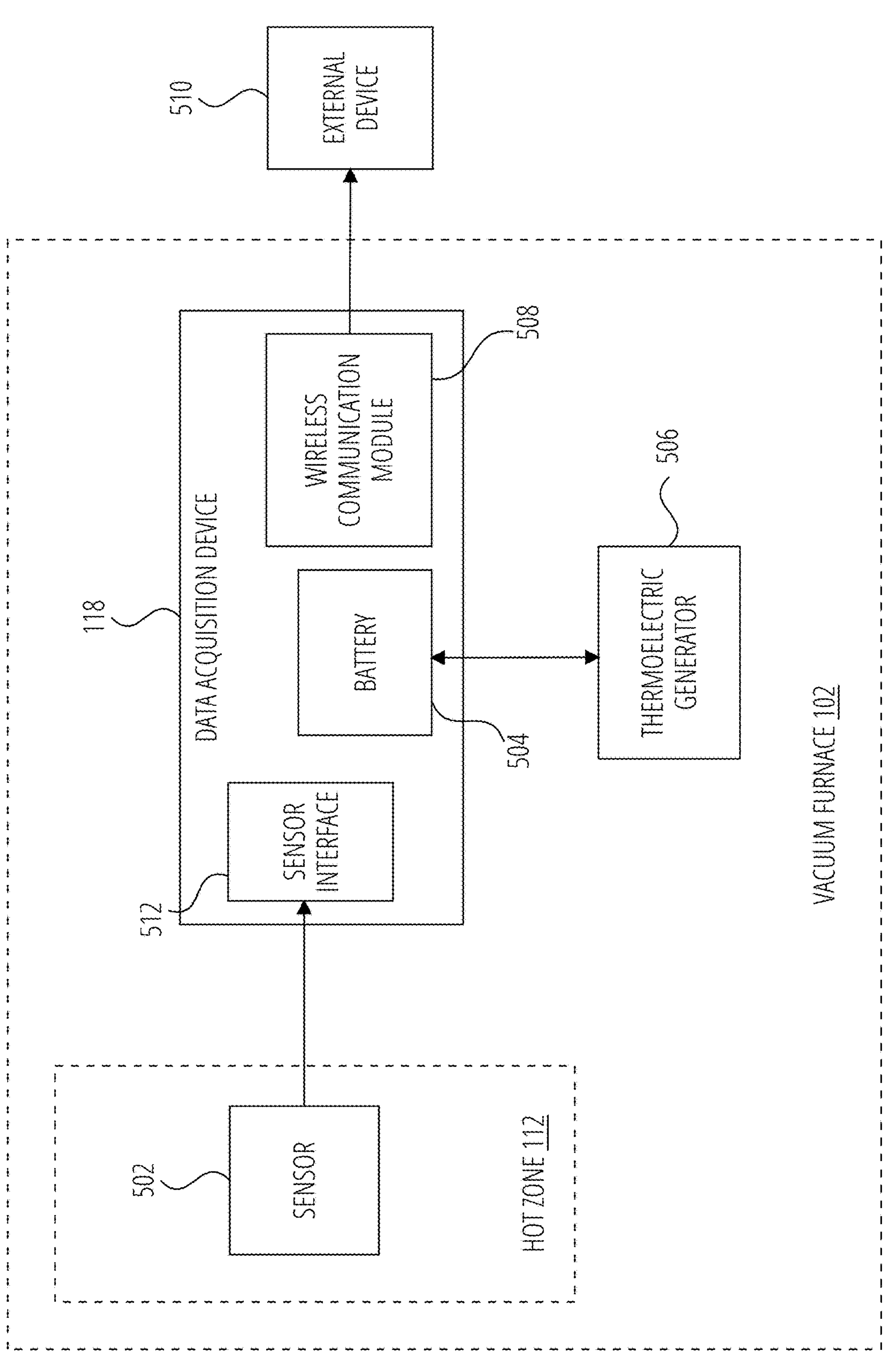
FIG. 5 shows a block diagram of a cold wall vacuum furnace system, in accordance with some examples disclosed herein.

FIG. 5 shows a block diagram of the general positioning of various component parts of a cold wall vacuum furnace 102 system. One or more sensors 502 are positioned in a hot zone 112 of the cold wall vacuum furnace 102. In examples, the one or more sensors 502 may comprise one or more thermocouples. A data acquisition device 118 is positioned inside the cold wall vacuum furnace 102, but outside of the hot zone 112. The one or more sensors 502 may be coupled to the data acquisition device 118 via means of a sensor interface 512. The data acquisition device 118 may further comprise a battery 504, electrically coupled to a thermoelectric generator 506 located inside of the cold wall vacuum furnace 102. The data acquisition device 118 may further comprise a wireless communication module 508, which is wirelessly communicatively coupled with an external device 510. The external device 510 is located outside of the cold wall vacuum furnace 102, such that a user or operator can access the external device 510 in order to view data from the data acquisition device 118, provide instructions to the data acquisition device 118, or edit a configuration of the data acquisition device 118. The external device 510 may comprise one or more of a control panel device fixable to an external surface of the furnace, a personal computer, a mobile or tablet device, a local server, or a server located off-site such as a cloud server.

In examples, the data acquisition device 118 may include a data storage module. The data storage module may be used to store data internally in the data acquisition device 118, either in addition to transmitting data to the external device 510 or as an alternative to transmitting data to the external device 510. The data storage module may comprise a physical storage medium, such as for example a flash memory (e.g. erasable programable read-only memory), a solid state drive (SSD), a hard disk drive (HDD), an optical disk drive, or a memory card media device.

The wireless communication module may be arranged to transmit sensor data from the data acquisition device to the external device, whereupon the external device can save the data to a storage device or memory, or can present the data for display on a graphical interface or similar. The wireless communication module may additionally or alternatively be arranged to receive at the data acquisition device control information or instructions from the external device. Additionally or alternatively, the wireless communication module may transmit configuration files from the data acquisition device to the external device, and receive modified configuration files from the external device at the data acquisition device. Various types of wireless communication may be used by the wireless communication module, including, by way of example only, WiFi, Bluetooth, cellular communication (including 2G, 3G, 4G, 5G), radio frequency identification (RFID), short-wave or long-wave radio, or similar technologies.

Figure 6:
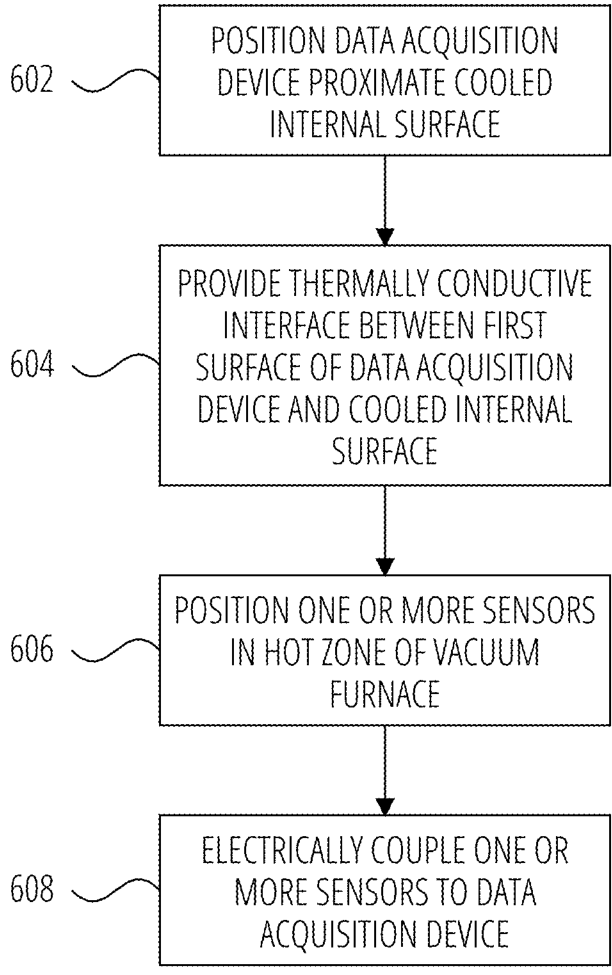
FIG. 6 shows a flowchart of a method of configuring a data acquisition device, according to some examples disclosed herein.

FIG. 6 shows a flowchart of a method, according to examples disclosed herein. At block 602, a data acquisition device, such as data acquisition device 118, is positioned proximate to a cooled internal surface of a cold wall vacuum furnace. At block 604, a thermally conductive interface is provided between a first surface of the data acquisition device and the cooled internal surface of the vacuum furnace. In some examples, providing the thermally conductive interface comprises inserting a thermally conductive layer, such as a thermal paste, into a gap between the data acquisition device and the cooled internal surface of the vacuum furnace. At block 606, one or more sensors, for example one or more thermocouples, are positioned in a hot zone of the cold wall vacuum furnace. At block 608, the one or more sensors are electrically coupled to the data acquisition device.

The steps shown in FIG. 6 are provided by way of example only, and may be carried out in orders differently to that shown in FIG. 6. This is to say, the order of the steps of FIG. 6 can be varied without impacting the effects of the disclosed method. For example, a thermally conductive layer may be applied to a first surface of the data acquisition device before locating the data acquisition device proximate the cooled internal surface of the vacuum furnace. In this way, the thermally conductive layer on the first surface of the data acquisition device is brought into contact with the cooled internal surface to form the thermally conductive interface. Conversely, the thermally conductive layer may be applied to the cooled internal surface of the vacuum furnace before locating the data acquisition device proximate the cooled internal surface. In this way, the thermally conductive layer on the cooled internal surface of the vacuum furnace is brought into contact with the first surface of the data acquisition device in order to form the thermally conductive interface.

Similarly, in some examples the one or more sensors may be coupled to the data acquisition device prior to positioning the one or more sensors in the hot zone of the vacuum furnace. In some examples, the one or more sensors may be positioned and/or coupled to the data acquisition device prior to positioning of the data acquisition device and/or application of a thermally conductive layer. In examples, the one or more sensors may be electrically coupled by means of electrically conductive cables, including high temperature cables, between the one or more sensors and the data acquisition device. In some examples, the coupling may comprise capacitive or inductive coupling between the one or more sensors and the data acquisition device.

Reference is made herein to thermocouples positioned in the hot zone of the vacuum furnace. However, the teachings provided herein apply also to alternative forms of temperature sensor, including thermistors, resistance temperature detectors (RTDs), and semiconductor-based integrated circuit temperature sensors. Additionally, non-temperature sensors may be used, including air pressure sensors (for example pneumatic sensors, or capacitive barometric sensors), gas sensors (for control or monitoring of a gas quenching stage), particulate detection sensors, or similar. Accordingly, the present disclosure should not be interpreted as limited to thermocouples, but instead is applicable to any form of sensor for which it may be desirable to position the sensor in the hot zone of a cold wall vacuum furnace. Where multiple sensors are used, they may be of different types.

Figure 7:
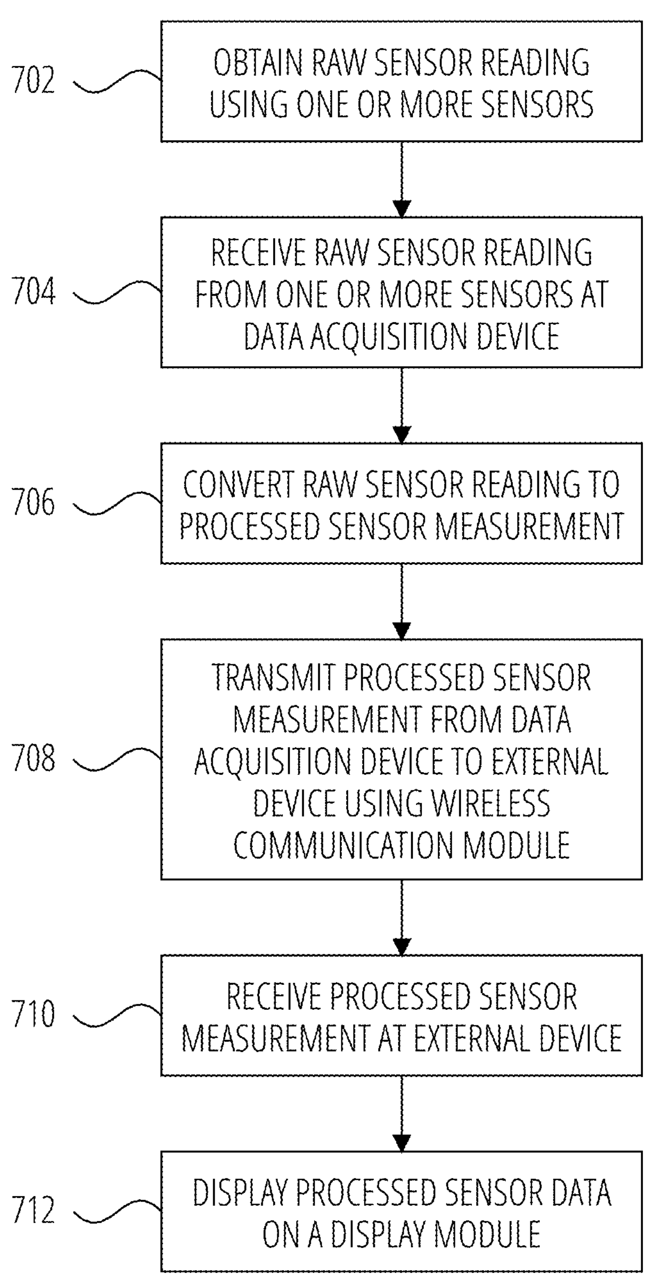
FIG. 7 shows a flowchart of a method of data acquisition, according to some examples disclosed herein.

FIG. 7 shows a flowchart of a method of data acquisition according to examples disclosed herein. At block 702, raw sensor readings are obtained using one or more sensors, such as sensors 502, located in a hot zone of a vacuum furnace. The raw sensor readings may be obtained as a voltage, current, resistance, inductance, capacitance, or similar. At block 704, the raw sensor readings from the one or more sensors are received at a data acquisition device, such as data acquisition device 118, via a sensor interface, such as sensor interface 512. The data acquisition device is disposed inside of the cold wall vacuum furnace, and is positioned proximate a cooled internal surface of the cold wall vacuum furnace, with a thermally conductive layer arranged between the data acquisition device and the cooled internal surface. At block 706, the data acquisition device processes the raw sensor data to obtain a processed sensor measurement. In examples, this processing may comprise converting a voltage or current value of the raw sensor reading into a corresponding temperature value. At block 708, the processed sensor measurement is transmitted from the data acquisition device using a wireless communication module, for example wireless communication module 508. Through use of a wireless communication module, a user or operator is able to view data from or control the data acquisition device whilst the data acquisition device is located inside of the vacuum furnace in some embodiments. The use of a wireless communication module as opposed to wired communication avoids compromising the integrity of the vacuum caused by feeding cables from inside to outside of the furnace vessel between the data acquisition device and the external device. Accordingly, the benefits achieved by eliminating the use of feed-through connectors for the sensors are maintained when wirelessly connecting the data acquisition device to an external device. In examples, a copy of the processed sensor measurement may additionally be stored to a local storage of the data acquisition device. At block 710, the processed sensor measurement is received at an external device located outside of the vacuum furnace. The external device may comprise a control panel device, personal computer, mobile device, tablet device, local server, cloud server, or similar. The external device may store the processed sensor measurement to a memory or local storage. At block 712, the external device displays the processed sensor measurement on a display module of the external device. The processed sensor measurement may be displayed numerically, graphically, or a combination thereof. In examples, only the most recent processed sensor measurement corresponding to each sensor of one or more sensors is displayed. In some examples, historical measurements corresponding to processed sensor measurements over a defined time period are displayed.

Figure 8:
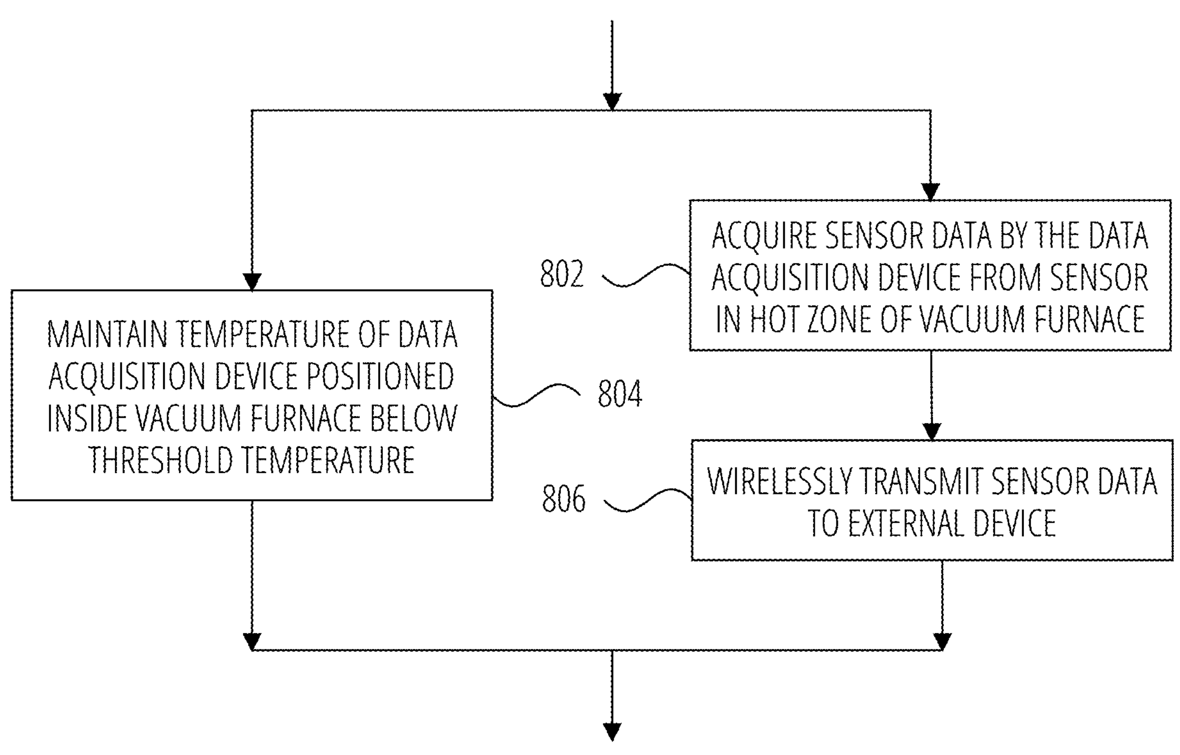
FIG. 8 shows a flowchart of a method of data acquisition, according to some examples disclosed herein.

FIG. 8 shows a flowchart of a method of data acquisition according to examples disclosed herein. At block 802, sensor data is acquired by a data acquisition device, for example data acquisition device 118, from one or more sensors, such as sensors 502. The one or more sensors may be positioned in a hot zone 112 of the vacuum furnace. In examples, the sensor data may comprise temperature sensor data of a temperature of the hot zone of the vacuum furnace. In examples, the sensor data may comprise pressure sensor data, gas sensor data, particulate detection sensor data, or similar.

At block 806, the acquired sensor data is wirelessly transmitted from the data acquisition device to an external device positioned outside of the vacuum furnace, such as external device 510. The wireless transmission of the sensor data may be performed by a wireless communication module of the data acquisition device, such as wireless communication module 508 of data acquisition device 118. By transmitting the sensor data wirelessly, connections through the wall of the vacuum chamber of the furnace are avoided, hence ensuring vacuum integrity. In some examples, the transmitted sensor data may be displayed on a display of the external device.

Whilst the method according to blocks 802 and 806 is performed, the method of block 804 is performed simultaneously. At block 804, a temperature of the data acquisition device, said data acquisition device being positioned inside the vacuum furnace, is maintained below a threshold temperature. In one embodiment, the temperature of the data acquisition device is maintained below the threshold temperature at all times during operation of the vacuum furnace, including during a warm-up and/or cool-down process of the vacuum furnace.

The threshold temperature below which the temperature of the data acquisition device is to be maintained may be determined based on an operating temperature of a cooled internal surface of the vacuum furnace. By way of example, the threshold temperature of the data acquisition device may be substantially the same as the operating temperature of the cooled internal surface, or the threshold temperature of the data acquisition device may be set as a specified amount higher than the operating temperature of the cooled internal surface of the vacuum furnace, such as +1° C., +2° C., +5° C. or +10° C. compared to the operating temperature of the cooled internal surface of the vacuum furnace.

In other examples, the threshold temperature may be determined based on a temperature difference between an operating temperature of a hot zone of the vacuum furnace and an operating temperature of a cooled internal surface of the vacuum furnace. The threshold temperature may be determined based on a specified percentage drop in temperature compared to the hot zone of the vacuum furnace. Alternatively, the temperature threshold may be determined based on one or more operating parameters of the data acquisition device, including one or more of a maximum effective operating temperature of a housing of the data acquisition device, a processor thermal design power (TDP) of a processor or microcontroller of the data acquisition device, an effective temperature at which an operating tolerance of one or more components is within a specified limit, or similar. This is to say, the temperature threshold may be determined based on maximum operating temperature limits of the data acquisition device hardware (i.e. a temperature at which components of the hardware will fail or act erratically), or an ideal operating temperature range of the data acquisition device hardware (i.e. a temperature at which components of the hardware operate within a specified tolerance or accuracy).

According to examples, the temperature of the data acquisition device is maintained below a threshold temperature through dissipation of heat, via thermal coupling, from the data acquisition device to a cooled internal surface of the vacuum furnace. This thermal coupling may comprise a thermally conductive layer disposed between the data acquisition device and the cooled internal surface of the vacuum furnace. The thermal coupling may additionally or alternatively comprise one or more thermally conductive magnets arranged to secure the data acquisition device to the cooled internal surface of the vacuum furnace, which additionally provides a means of securing the data acquisition device within the furnace without use of mechanical fasteners that penetrate the wall of the vacuum furnace, such as bolts, screws, rivets, or similar.

In addition to the dissipation of heat via thermal coupling, the temperature of the data acquisition device may also be maintained below the threshold temperature through use of a thermally insulating coating disposed on one or more surface of the data acquisition device, to reduce absorption of heat from the furnace by the data acquisition device.

By maintaining the temperature of the data acquisition device below the threshold temperature, overheating of the data acquisition device during operation can be avoided. Accordingly, the data acquisition device is less susceptible to interruption of data recording or corruption of recorded data due to shut down of the device due to overheating.

Through use of thermal coupling by means of a thermally conductive layer, higher maximum operating temperatures for the vacuum furnace can be achieved compared to conventional methods. In particular, higher operating temperatures are possible using the cooling provided by the thermally conductive layer and the cooled internal surface, as opposed to using a thermally insulated enclosure without any cooling. Additionally, by using the thermally conductive layer to maintain the data acquisition device below a temperature threshold, outgassing of the insulating material of a thermally insulating layer (e.g. a thermally insulated enclosure) is avoided, and hence sufficient vacuum can be maintained. The outgassing may be avoided by not using a thermally insulating layer at all, because the cooling provided by the thermally conductive layer is sufficient, or by transferring heat away from the thermally insulating layer in addition to the data acquisition device, thus preventing the thermally insulating layer from reaching an outgassing temperature.

According to examples of the present disclosure, there is provided a measurement apparatus for a cold wall vacuum furnace, comprising a data acquisition device, comprising a sensor interface operable to electrically couple one or more sensors to the data acquisition device; and a thermally conductive layer disposed on a first surface of the data acquisition device and to provide a thermally conductive interface between a first surface of the data acquisition device and a cooled internal surface of the cold wall vacuum furnace.

Some examples may further comprise a thermally insulating layer arrangeable on a second surface of the data acquisition device, the second surface being different from the first surface. The thermally insulating layer may act to protect the data acquisition device from heat conducted and/or radiated from the hot zone of the vacuum furnace. The thermally insulating layer may act in conjunction with the thermally conductive layer to reduce or limit the overall temperature of the data acquisition device during operation of the vacuum furnace.

In some examples the data acquisition device further comprises a battery; and the measurement apparatus further comprises a thermoelectric generator coupled to the battery of the data acquisition device. The thermoelectric generator is operable to charge the battery of the data acquisition device. Some examples may further comprise a battery controller arranged to control charging of the battery. The battery controller may be implemented in one or more application-specific integrated circuits (ASICs), digital signal processors, discrete circuitry, logic gates, standard integrated circuits, microcontrollers, embedded controllers, field-programable gate arrays (FPGAs), complex programable logic devices (CPLDs), and various combinations thereof.

Some examples may further comprise one or more magnets arrangeable to secure at least one of the data acquisition device and the thermally conductive layer to the cooled internal surface of the cold wall vacuum furnace. The one or more magnets may act to secure the data acquisition device to the cooled internal surface without the use of a mechanical fastener such as a screw, bolt, rivet, or similar. The use of magnets may aid in maintaining the integrity of the vacuum of the furnace vessel. In some examples, the magnets may be thermally conductive. In some examples, the magnets may have a curved surface arranged to interface with the cooled internal surface of the vacuum furnace.

In some examples the data acquisition device further comprises a wireless communication module, the wireless communication module operable to enable the data acquisition device to communicate with an external device outside of the cold wall vacuum furnace. The data may be sensor data from the one or more sensors. The wireless communication module may additionally or alternatively be operable to receive control information from the external device. In examples, the data acquisition device may include a data storage module, which may be operable to store at least some of the sensor data.

In some examples the thermally conductive layer is malleable. The thermally conductive layer may be operable to conform to a shape of the cooled internal surface of the vacuum furnace, or to conform to a shape of the first surface of the data acquisition device.

Some examples may further comprise one or more sensors arrangeable to be positioned in a hot zone of the cold wall vacuum furnace, the one or more sensors electrically couplable to the data acquisition device.

In some examples the one or more sensors comprises one or more thermocouples. In some examples, at least one of the one or more sensors may comprise one or more thermistors, resistance temperature detectors (RTDs), pneumatic sensors, capacitive barometric sensors, gas sensors, or particulate detection sensors.

According to examples of the present disclosure, there is provided a method for data acquisition in a cold wall vacuum furnace, the method comprising positioning a data acquisition device proximate a cooled internal surface of a cold wall vacuum furnace; and providing a thermally conductive interface between a first surface of the data acquisition device and the cooled internal surface of the cold wall vacuum furnace.

Some examples further comprise securing the data acquisition device to the cooled internal surface of the vacuum furnace using one or more magnets.

Some examples further comprise connecting a thermoelectric generator to the data acquisition device, the thermoelectric generator positioned inside the cold wall vacuum furnace.

Some examples further comprise applying a thermally insulating layer to a second surface of the data acquisition device, the second surface being different from the first surface.

Some examples further comprise positioning one or more sensors in a hot zone of the cold wall vacuum furnace; and electrically coupling the one or more sensors to the data acquisition device.

According to examples of the present disclosure, there is provided a system for data acquisition in a cold wall vacuum furnace comprising a cold wall vacuum furnace, the cold wall vacuum furnace having a hot zone and a cooled internal surface; one or more sensors positioned in the hot zone of the vacuum furnace; a data acquisition device positioned proximate the cooled internal surface of the vacuum furnace, and electrically coupled to the one or more sensors; a thermally conductive layer arranged to provide a thermally conductive interface between a first surface of the data acquisition device and the cooled internal surface of the vacuum furnace.

According to examples of the present disclosure, there is provided a method for data acquisition from a vacuum furnace, comprising maintaining a temperature of a data acquisition device positioned inside the vacuum furnace below a threshold temperature; and acquiring, by the data acquisition device, sensor data from one or more sensors positioned in a hot zone of the vacuum furnace as the temperature of the data acquisition device is being maintained below the threshold temperature.

Some examples further comprise wirelessly transmitting sensor data to an external device positioned externally to the vacuum furnace.

In some examples maintaining a temperature of the data acquisition device comprises dissipating heat, via thermal coupling, from the data acquisition device to a cooled internal surface of the vacuum furnace.

In some examples, the sensor data comprises temperature sensor data of a temperature of the hot zone of the vacuum furnace.

According to examples of the present disclosure, there is provided a system for data acquisition in a cold wall vacuum furnace comprising a cold wall vacuum furnace, the cold wall vacuum furnace having a hot zone and a cooled internal surface; one or more sensors positioned in the hot zone of the vacuum furnace; and a measurement apparatus according to one or more other examples provided herein.

Some examples further comprise an external device positioned externally to the vacuum furnace, and wirelessly communicatively coupled to the data acquisition device.

In some embodiments, some or all of the methods and/or functionality, including but not limited to aspects of the data acquisition device, may be implemented or provided in other manners, such as at least partially in firmware and/or hardware, including but not limited to one or more application-specific integrated circuits (ASICs), digital signal processors, discrete circuitry, logic gates, standard integrated circuits, controllers (e.g. by executing appropriate instructions, convolutional accelerators, and including microcontrollers and/or embedded controllers), field-programable gate arrays (FPGAs), complex programable logic devices (CPLDs), and various combinations thereof.

All of the features disclosed in this specification (including any accompanying claims, abstract, and drawings) may be combined in any combination, except combinations where some features are mutually exclusive. Each feature disclosed in this specification, including any accompanying claims, abstract, and drawings, may be replaced by alternative features serving the same, equivalent, or similar purpose, unless expressly stated otherwise. Thus, unless expressly stated otherwise, each feature disclosed in one example of a generic series of equivalent or similar features.

The present teachings are not restricted to the details of any of the foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The invention claimed is:

1. A measurement apparatus for a vacuum furnace, comprising:

a data acquisition device, comprising a sensor interface operable to electrically couple one or more sensors to the data acquisition device; and a thermally conductive layer disposed on a first surface of the data acquisition device and to provide a thermally conductive interface between the first surface of the data acquisition device and a cooled internal surface of the vacuum furnace.

2. The measurement apparatus of claim 1, further comprising a thermally insulating layer arrangeable on a second surface of the data acquisition device.

3. The measurement apparatus of claim 1, wherein the data acquisition device further comprises a battery; and further comprising a thermoelectric generator coupled to the battery of the data acquisition device.

4. The measurement apparatus of claim 1, further comprising one or more magnets arrangeable to secure at least one of the data acquisition device and the thermally conductive layer to the cooled internal surface of the vacuum furnace.

5. The measurement apparatus of claim 1, wherein the data acquisition device further comprises a wireless communication module, the wireless communication module operable to enable the data acquisition device to communicate with an external device outside of the vacuum furnace.

6. The measurement apparatus of claim 1, wherein the thermally conductive layer is malleable.

7. The measurement apparatus of claim 1, further comprising the one or more sensors arrangeable to be positioned in a hot zone of the vacuum furnace, the one or more sensors electrically couplable to the data acquisition device.

8. The measurement apparatus of claim 7, wherein the one or more sensors comprises one or more thermocouples.

9. A method for configuring data acquisition devices, comprising:

positioning a data acquisition device proximate a cooled internal surface of a vacuum furnace, the data acquisition device comprising a sensor interface operable to electrically couple one or more sensors to the data acquisition device; and providing a thermally conductive layer disposed on a first surface of the data acquisition device which provides a thermally conductive interface between the first surface of the data acquisition device and the cooled internal surface of the vacuum furnace.

10. The method of claim 9, further comprising:

securing the data acquisition device to the cooled internal surface of the vacuum furnace using one or more magnets; and/or connecting a thermoelectric generator to the data acquisition device, the thermoelectric generator being positioned inside the vacuum furnace.

11. The method of claim 9, further comprising applying a thermally insulating layer to a second surface of the data acquisition device.

12. The method of claim 9, further comprising:

positioning the one or more sensors in a hot zone of the vacuum furnace; and electrically coupling the one or more sensors to the data acquisition device.

13. A method for data acquisition from a vacuum furnace, comprising:

maintaining a temperature of a data acquisition device of a measurement apparatus positioned inside the vacuum furnace below a threshold temperature, wherein the data acquisition device comprises a sensor interface operable to electrically couple one or more sensors positioned in a hot zone of the vacuum furnace to the data acquisition device, and wherein maintaining the temperature of the data acquisition device comprises dissipating heat, via thermal coupling, from the data acquisition device to a cooled internal surface of the vacuum furnace, via a thermally conductive layer disposed on a first surface of the data acquisition device which provides a thermally conductive interface between the first surface of the data acquisition device and the cooled internal surface of the vacuum furnace; and acquiring, by the data acquisition device, sensor data from the one or more sensors positioned in the hot zone of the vacuum furnace as the temperature of the data acquisition device is being maintained below the threshold temperature.

14. The method of claim 13, further comprising wirelessly transmitting sensor data to an external device positioned externally to the vacuum furnace.

15. A system for data acquisition from a vacuum furnace, comprising:

the vacuum furnace, the vacuum furnace having a hot zone and a cooled internal surface;

the measurement apparatus of claim 1; and the one or more sensors positioned in the hot zone of the vacuum furnace.

16. The system of claim 15, further comprising an external device positioned externally to the vacuum furnace, and wirelessly communicatively coupled to the data acquisition device.

17. The system of claim 15, wherein the measurement apparatus further comprises a thermally insulating layer arrangeable on a second surface of the data acquisition device.

18. The system of claim 15, wherein the data acquisition device further comprises a battery; and the measurement apparatus further comprises a thermoelectric generator coupled to the battery of the data acquisition device.

19. The system of claim 15, wherein the measurement apparatus further comprises one or more magnets arrangeable to secure at least one of the data acquisition device and the thermally conductive layer to the cooled internal surface of the vacuum furnace.

20. The system of claim 15, wherein the thermally conductive layer of the measurement apparatus is malleable.

* * * * *